United States Patent [19]
Altenpohl

[11] 3,944,078
[45] Mar. 16, 1976

[54] COUNTER CONTROLLED PRODUCT CONVEYOR DISTRIBUTION SYSTEM

[75] Inventor: William F. Altenpohl, Gladwyne, Pa.

[73] Assignee: W. F. Altenpohl, Inc. (Entire), West Conshohocken, Pa.

[22] Filed: Aug. 27, 1974

[21] Appl. No.: 500,871

[52] U.S. Cl. .................. 209/73; 209/121; 177/50; 198/38
[51] Int. Cl.² ........................................ B07B 13/08
[58] Field of Search ...... 209/74 R, 121, 73; 177/50; 235/61.6 L; 104/88; 198/41, 38, 19, 34

[56] References Cited
UNITED STATES PATENTS

| | | | |
|---|---|---|---|
| 2,471,711 | 5/1949 | Altenpohl | 209/121 |
| 2,886,164 | 5/1959 | Solecki | 198/19 |
| 3,291,303 | 12/1966 | Altenpohl | 209/121 |

*Primary Examiner*—Robert B. Reeves
*Assistant Examiner*—Joseph J. Rolla
*Attorney, Agent, or Firm*—Clarence A. O'Brien; Harvey B. Jacobson

[57] ABSTRACT

Poultry carriers release birds at a plurality of work stations to which they are conveyed, under control of weight sensing devices and resettable counters. The birds reaching each group of work stations are limited to a common weight range by weight sorting mechanism to activate the counters through associated weight sensing devices. The counters are arranged to trigger carrier release devices at each work station in response to the counting of different preset numbers of birds within the common weight range so as to obtain equal distribution of the birds released at each of the work stations.

10 Claims, 4 Drawing Figures

COUNTER CONTROLLED PRODUCT CONVEYOR DISTRIBUTION SYSTEM

This invention relates to poultry conveyor systems through which poultry carriers convey birds within certain weight ranges to work stations at which the birds are processed.

Overhead conveyor systems for transporting poultry to various work stations in a poultry processing plant, are well known. Generally, the birds are placed on releasable carriers or shackles, suspended from the overhead conveyor, at a loading station from which the carriers are conveyed through various weight sorting or weighing stations and are automatically released at and transferred to various work stations where personnel perform various operations on the birds such as cutting, cleaning, etc. In order to meet certain production rate requirements, operations are performed simultaneously by several persons. This has heretofore required that the birds be released from the main conveyor and stored temporarily at the work area or transferred to a circulating conveyor at the work area from which all personnel at this work area may conveniently withdraw birds to perform their operations. The additional equipment peripheral to the main conveyor necessary to the supply of birds to several work stations at which similar operations are simultaneously performed, does therefore involve some expense and a loss of transfer time heretofore deemed unavoidable when increasing production rates in a poultry processing plant. There is also a problem in providing all personnel equal access to the birds delivered to a work area for a particular operation.

It is therefore a primary object of the present invention to provide several separate work stations along the path of travel of a common conveyor at which poultry, limited to the desired weight range, is released and distributed equally.

In accordance with the present invention, a conventional type of overhead poultry conveyor suspending releasable poultry carriers, has at least one group of adjacent weight sensing stations at which birds above a preset weight are automatically released. However, operation of the releasing mechanism associated with each weight sensing station is overruled through counters connected to each weight sensing device to render each releasing mechanism operative sequentially, beginning with the one most remote from the loading station in the direction of travel. Thus, the counter at the first work station in the direction of travel will count a quantity of birds detected by its associated weight sensor equal in number to the number of work stations before its releasing device is enabled and the counter reset. The other counters are preset to count preset numbers of birds in descending or inverse order relative to the direction of travel. Equal numbers of birds are thereby released in sequence at each of the work stations.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
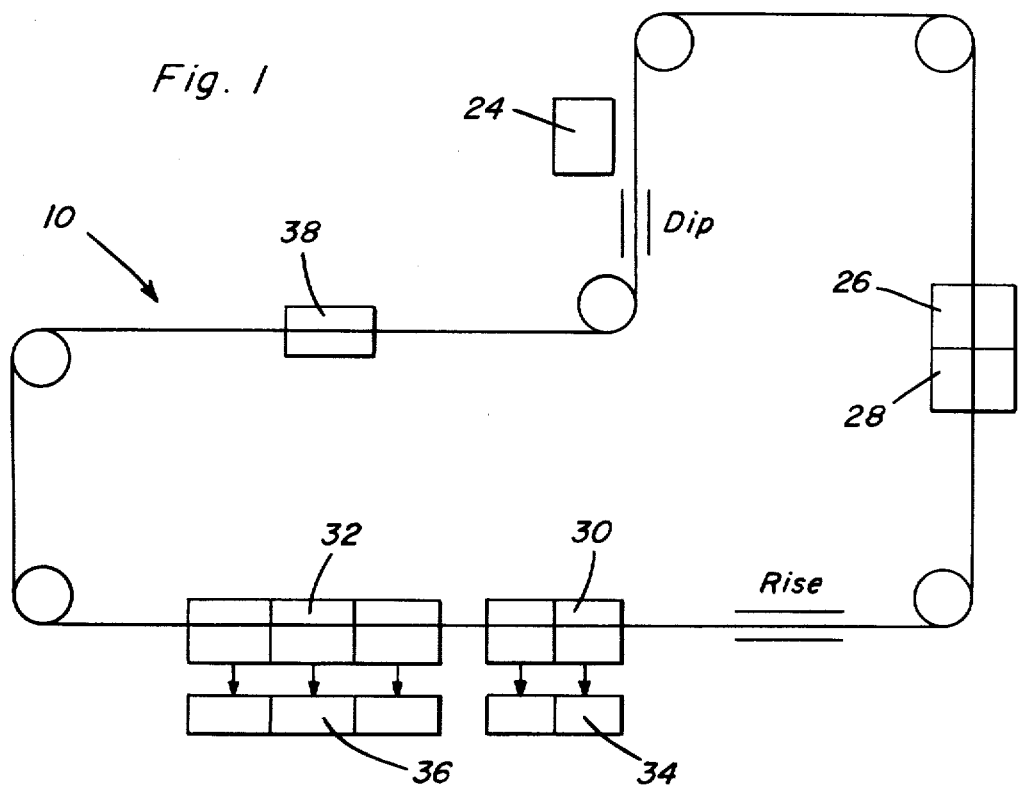
FIG. 1 is a schematic top plan view of a conveyor system arranged in accordance with the present invention.
Figure 2:
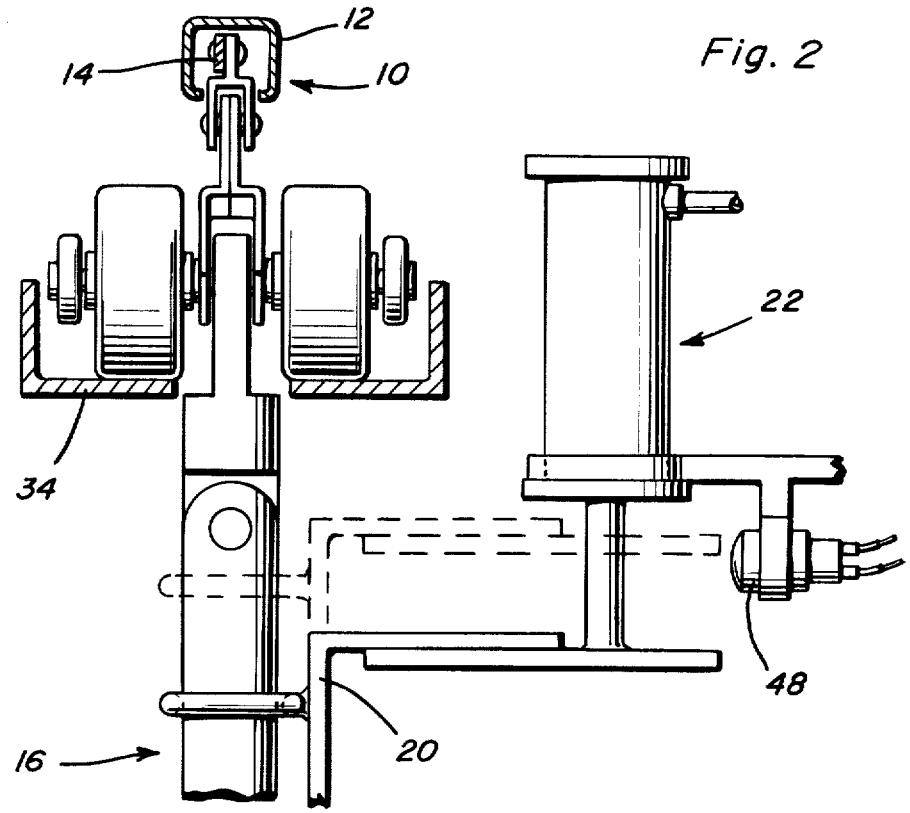
FIG. 2 is a transverse section view through the conveyor at one of the weight sensing and work stations.

Referring now to the drawings in detail, FIG. 1 illustrates one exemplary embodiment of the present invention, associated with a continuous poultry conveyor 10. Conveyors of this type are shown for example in prior U.S. Pat. No. 3,291,303 to Altenpohl. The path of travel diagrammed in FIG. 1, is established by the overhead conveyor channel 12 as shown in FIG. 2 enclosing the continuous conveyor chain 14 from which poultry carriers 16 are pivotally suspended. The birds or other objects are dropped by upward displacement of a release latch 20 on each carrier, in response to operation of a releasing mechanism 22 as shown in FIG. 2. The birds are loaded onto the carriers 16 at a loading station 24 as diagrammed in FIG. 1.

Figure 4:
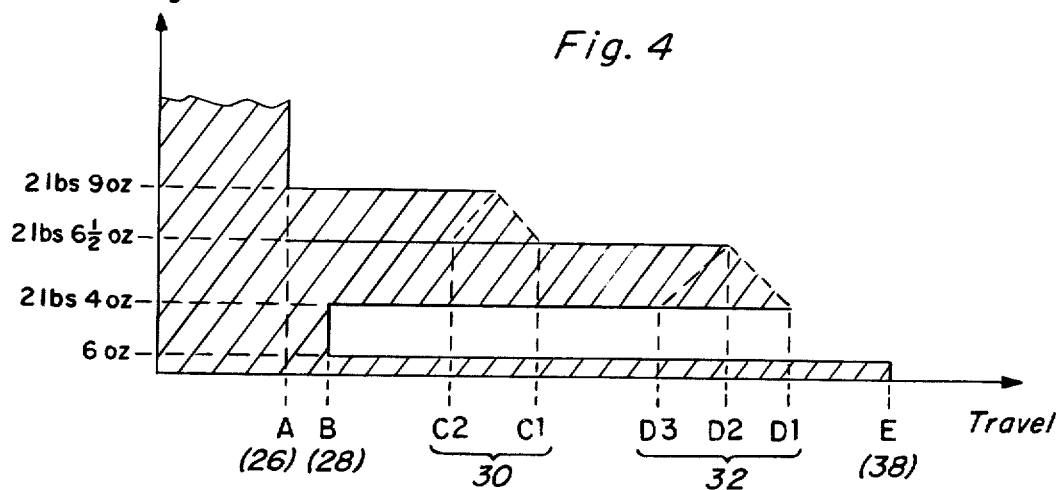
FIG. 4 is a graphical diagram showing the movement of poultry along the conveyor path of travel.

With continued reference to FIG. 1, the birds are conveyed from the loading station 24 through a standard weight sorting station 26 wherein birds above a predetermined weight, such as 2 pounds, 9 ounces, are dropped into a bin. Weight sensing and releasing mechanism suitable for this purpose is disclosed, for example, in U.S. Pat. No. 2,471,711 to Altenpohl. Thus, only birds below 2 pounds, 9 ounces will pass through the next weight sorting station 28 wherein birds between predetermined upper and lower weight limits are dropped into a bin. For example, an upper weight limit of 2 pounds, 4 ounces and a lower weight limit of 6 ounces may be set so as to pass only birds above 2 pounds, 4 ounces in weight at station 28 but below the 2 pounds. 9 ounces limit established at the previous station 26. The foregoing movement of birds within the weight limits established at stations 26 and 28 is graphically illustrated in FIG. 4. It will be noted that anything below 6 ounces will also pass through the stations 26 and 28. The 6 ounce limit was selected as the minimum weight capable of being effectively detected by the weighing devices employed at the stations 26 and 28. Such weighing devices are disclosed in U.S. Pat. No. 3,291,303, to Altenpohl which also discloses an arrangement of weighing devices capable of establishing upper and lower weight limits between which birds are dropped as described in connection with station 28. The same type of weighing device is also employed at each of the weighing stations 30 and 32 shown in FIG. 1 and includes a vertically movable section of track 34 over which the carrier 16 is conveyed as shown in FIG. 2.

In the embodiment illustrated in FIG. 1, the weighing devices or weight sensors and associated mechanism including the release mechanism 22 are the same except that the weighing devices at stations 30 are set to effect release of all birds above 2 pounds, 6½ ounces, for example, intermediate the weight range limits established at stations 26 and 28, while the weighing devices at stations 32 are set to effect release of all birds above 2 pounds, 4 ounces corresponding to the lower limit of the aforementioned weight range. The stations 30 and 32 respectively release birds onto two separate groups of work or receiving stations 34 and 36. Thus, several persons may simultaneously perform the same operations at work areas formed by each of the groups of work stations 34 and 36. Any birds that remain on the carriers after passing through all of the stations 32, may be released at station 38 in preparation for reloading at the loading station 24.

Figure 3:
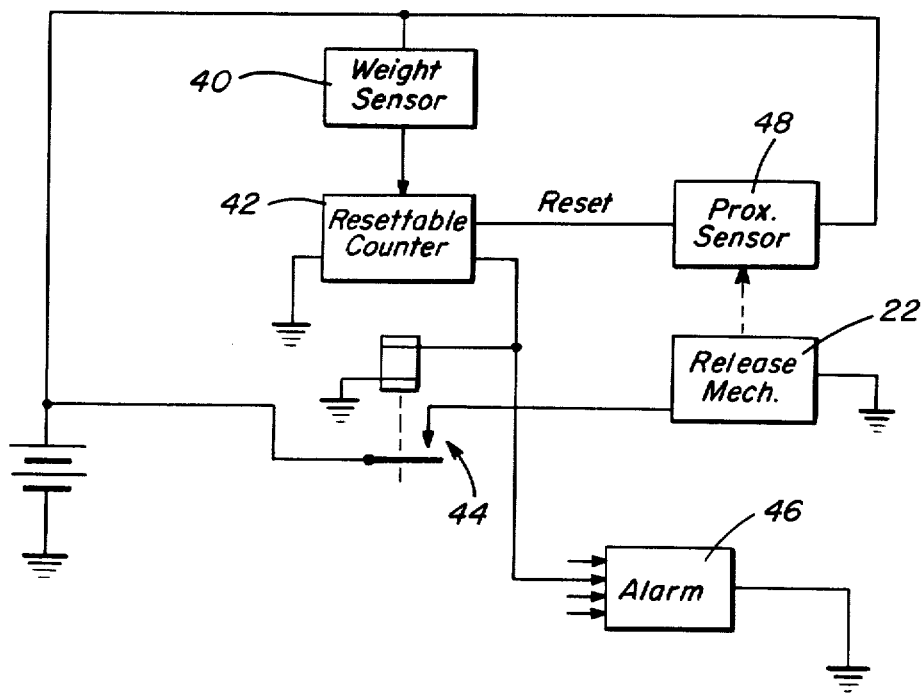
FIG. 3 is a simplified electrical circuit diagram of typical controls associated with the weight sensing work stations.

Referring now to FIG. 3, a weight sensor 40 is associated with each of the stations 30 and 32. A resettable counter 42 is actuated by the sensor 40 whenever an object above the preset weight of 2 pounds, 6½ ounces or 2 pounds, 4 ounces is detected. The counter 42 thereby counts a preset quantity of birds within the weight range predetermined at stations 26 and 28 before it generates an output signal applied to a relay 44 and an alarm device 46. The relay 44 operates the release mechanism 22 in response to the output signal which is also registered by the alarm device 46. A proximity sensor 48 detects operation of the release mechanism to reset the counter 42 and initiate a new cycle. The simple electrical circuit shown in FIG. 3 is merely exemplary. More complex solid state circuitry and/or fluidic controls may be used. Similarly, electronic or fluidic counters 42 could be used. The details of the circuitry and components thereof form no part of this invention since the design of such circuitry and selection of its components is within the ordinary capability of one skilled in the art.

The number of work stations in the group within which distribution of birds is to be regulated, determines the preset quantity of birds to be counted by counter 42 at the first work station in the direction of travel. Operation of the release mechanism 22 is thereby overruled so that the last work station in the group is the first to receive a bird followed by release of birds sequentially at preceding work stations in the direction of travel. Thus, operation of the release mechanism at the last work station follows a count of one. The preset quantities counted by the counters 42 therefore decrease in the direction of travel from the maximum count at the first work station. In this manner, equal numbers of birds are dropped in sequence at each work station without any stoppage or slow down of the conveyor. In the example shown in FIG. 1 and diagrammed in FIG. 4, the two work stations 30 therfore have their counters set for 2 and 1 respectively while the three counters for work stations 32 are set to count 3, 2 and 1 respectively in inverse relation to the direction of travel.

It will, of course, be appreciated that any number of groups and any number of work stations within each group may be employed in accordance with the principles of the present invention to accommodate different work operations, different numbers of personnel for each work operation and different weight ranges for the respective groups of work stations. Further, the station 28 may be eliminated and a single group of work stations established for a common weight range having a lower limit of 6 ounces to which all of the weight sensors 40 are set.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a system for conveying objects from a loading station to a plurality of operating stations at which only the objects within a common weight range are released from a conveyor by release devices under control of weight sensors, means for regulating distribution of said objects within the common weight range at said operating stations, comprising counter means connected to each of said weight sensors for counting different preset numbers of said objects detected by said weight sensors, the number of objects counted by each of the counter means being inversely related to the distance of the associated operating stations from the loading station, control means connected to the counter means and the release devices for releasing an equal number of said objects within said common weight range at each of said operating stations independently of the supply of objects thereat and means for resetting each of the counter means in response to operating of an associated one of the releasing devices.

2. The combination of claim 1 including weight sorting means connected to the conveyor system for limiting the objects conveyed to said operating stations to a predetermined weight range encompassing said common weight range.

3. The combination of claim 2 wherein each of said weight sensors is set for detection of a minimum weight below said common weight range.

4. The combination of claim 1 wherein said operating stations fall within at least two groups at which objects are released within two different common weight ranges.

5. The combination of claim 4 wherein the weight sensors associated with one of the two groups of operating stations are set for detection of objects above a minimum weight within said predetermined weight range and the other of the weight sensors associated with the other of said two groups of operating stations are set for detection of objects above a minimum weight substantially equal to a lower limit of said predetermined weight range.

6. The combination of claim 1 wherein each of said weight sensors is set for detection of a minimum weight below said common weight range.

7. The combination of claim 1 wherein said operating stations fall within at least two groups at which objects are released within two different common weight ranges.

8. In combination with a system for conveying objects and a plurality of stations to which the objects are transferred under control of weight sensors, means for regulating distribution of said objects at said stations comprising counter devices connected to said weight sensors for respectively counting only objects detected by the weight sensors, means connected to the counter devices for continuous transfer of equal numbers of the objects counted to each of said stations independently of the supply of objects thereat and in response to signals generated by the counter devices, said counter devices being respectively set to generate said signals in response to the counting of preset quantities of the objects decreasing in number in the direction of travel, and means for respectively resetting each of said counter devices in response to said transfer of the objects.

9. The combination of claim 8 wherein said objects are loaded poultry carriers.

10. The combination of claim 8 including a conveyor and carriers connected to the conveyor respectively supporting said objects, said weight sensors being operative to weigh the carriers in order to limit said transfer of objects to a predetermined weight range.

* * * * *